(12) United States Patent
Jung

(10) Patent No.: US 11,775,452 B2
(45) Date of Patent: Oct. 3, 2023

(54) NON-VOLATILE MEMORY CONTROLLER DEVICE AND NON-VOLATILE MEMORY DEVICE

(71) Applicants: MemRay Corporation, Gyeonggi-do (KR); Korea Advanced Institute of Science and Technology, Daejeon (KR)

(72) Inventor: Myoungsoo Jung, Daejeon (KR)

(73) Assignees: MemRay Corporation; Korea Advanced Institute of Science and Technology

(*) Notice: Subject to any disclaimer, the term of this patent is extended or adjusted under 35 U.S.C. 154(b) by 0 days.

(21) Appl. No.: 17/382,895

(22) Filed: Jul. 22, 2021

(65) Prior Publication Data

US 2022/0027295 A1  Jan. 27, 2022

(30) Foreign Application Priority Data

Jul. 23, 2020 (KR) .......... 10-2020-0091566
May 26, 2021 (KR) .......... 10-2021-0067487

(51) Int. Cl.
*G06F 13/16* (2006.01)
*G06F 13/28* (2006.01)
*G06F 13/42* (2006.01)

(52) U.S. Cl.
CPC .......... *G06F 13/1668* (2013.01); *G06F 13/28* (2013.01); *G06F 13/4282* (2013.01); *G06F 2213/0026* (2013.01)

(58) Field of Classification Search
None
See application file for complete search history.

(56) References Cited

U.S. PATENT DOCUMENTS 8,667,192 B2 * 3/2014 Allaire ............... G06F 15/7867
710/200
10,452,278 B2  10/2019 Benisty
(Continued)

FOREIGN PATENT DOCUMENTS

KR  20190131012 A  11/2019

OTHER PUBLICATIONS

Song et al., "Cosmos OpenSSD: A PCIe-based Open Source SSD Platform," Flash Memory Summit 2014 Santa Clara, CA, pp. 1-30.
(Continued)

*Primary Examiner* — Henry Tsai
*Assistant Examiner* — Christopher A Bartels
(74) *Attorney, Agent, or Firm* — Dinsmore & Shohl LLP

(57) ABSTRACT

In a non-volatile memory controlling device, a first doorbell region is exposed to a configuration space of a host interface and updated when the host issues an input/output (I/O) request command to the host memory. A fetch managing module fetches the command from the host memory in response to an event signal generated when the first doorbell region is updated. A data transferring module checks a location of the host memory based on request information included in the command, and performs a transfer of target data for the I/O request between the host memory and the non-volatile memory module. A completion handling module writes a completion request in the host memory and handles an interrupt when the data transferring module completes to process the I/O request. A second doorbell region is exposed to the configuration space and updated when the I/O service is terminated by the host.

16 Claims, 6 Drawing Sheets

(56) References Cited

U.S. PATENT DOCUMENTS

| | | |
|---|---|---|
| 10,817,182 B2 | 10/2020 | Benisty |
| 11,487,434 B2 | 11/2022 | Benisty |
| 2005/0165985 A1* | 7/2005 | Vangal ............... G06F 13/4027 710/107 |
| 2008/0025289 A1* | 1/2008 | Kapur .................. H04L 49/90 370/351 |
| 2009/0083392 A1* | 3/2009 | Wong .................... G06F 13/28 709/212 |
| 2012/0243160 A1* | 9/2012 | Nguyen .............. H05K 5/0017 361/679.08 |
| 2014/0006660 A1* | 1/2014 | Frei ..................... H04L 12/281 710/104 |
| 2014/0149706 A1* | 5/2014 | Shim ..................... G06F 13/28 711/165 |
| 2019/0042329 A1* | 2/2019 | Kakaiya ................ G06F 9/5088 |
| 2019/0377704 A1* | 12/2019 | Pope .................... G06F 13/385 |
| 2019/0385057 A1* | 12/2019 | Litichever ............ H04L 63/14 |
| 2020/0183876 A1* | 6/2020 | Das Sharma ....... G06F 13/4072 |
| 2021/0034526 A1* | 2/2021 | Pope .................... G06F 13/128 |
| 2022/0027294 A1* | 1/2022 | Jung ................... G06F 13/1668 |

OTHER PUBLICATIONS

"UltraScale Architecture and Product Data Sheet: Overview," DS890 (v4.0) Mar. 16, 2021, pp. 1-50.

"NVM Express Base Specification,", NVM Express Rev. 1.4, Jun. 10, 2019, pp. 1-403.

Kaist, "Open Express: Fully Hardware Automated Open Research Framework for Future Fast NVMe Devices," 2020 USENIX Annual Technical Conference, Jul. 15-17, 2020, pp. 1-9.

"Automatic-SSD: Full Hardware Automation over New Memory for High Performance and Energy Efficient PCIe Storage Cards," 2020 IEEE/ACM International Conference on Computer Aided Design (ICCAD), Nov. 2-5, 2020, pp. 1-9.

* cited by examiner

NON-VOLATILE MEMORY CONTROLLER DEVICE AND NON-VOLATILE MEMORY DEVICE

CROSS-REFERENCE TO RELATED APPLICATION

This application claims priority to and the benefit of Korean Patent Application No. 10-2020-0091566 filed in the Korean Intellectual Property Office on Jul. 23, 2020, and Korean Patent Application No. 10-2021-0067487 filed in the Korean Intellectual Property Office on May 26, 2021, the entire contents of which are incorporated herein by reference.

BACKGROUND

(a) Field

The described technology generally relates to a non-volatile memory controlling device and a non-volatile memory device.

(b) Description of the Related Art

Recently, as a new non-volatile memory such as a phase-change random-access memory (PRAM) or a magnetoresistive random-access memory (MRAM) as well as a solid-state drive (SSD) is used, a protocol for communication between a hose and the non-volatile memory is required. A non-volatile memory express (NVMe) is used as a representative protocol.

Currently, many SSD vendors implement controllers according to the NVMe specification as firmware by far. Even though the firmware-based controllers are sufficient for flash, firmware execution can be a critical performance bottleneck to expose a performance superiority delivered by fast non-volatile memories such as the PRAM and the MRAM. Latency of fast non-volatile memories is much shorter than that of the flash. CPU cycles to execute the firmware cannot be hidden behind or overlap with an I/O (input/output) burst time of the backend non-volatile memories.

Specifically, the latency of the NVMe SSD may be decomposed into two parts: i) an NVMe firmware execution time (frontend) and ii) backend memory access latency (backend). The access latency of flash-based backend contributes the most (approximately 90% or more) of the total service time, which can make the frontend firmware executions hide behind all the flash I/O bursts. However, in the PRAM or the MRAM, the firmware executions cannot be interleaved with the I/O burst time of the PRAM or MRAM as the firmware execution time takes account for the most of the total service time.

Therefore, in the new non-volatile memory, it is necessary to reduce or remove the firmware execution time which takes account for the most of the total service time.

SUMMARY

Some embodiments may provide a non-volatile memory controlling device and a non-volatile memory device that are automated with hardware.

According to an embodiment, a non-volatile memory controlling device configured to connect a non-volatile memory module and a host including a processor and a host memory is provided. The non-volatile memory controlling device includes a first doorbell region, a fetch managing module, a data transferring module, a completion handling module, and a second doorbell region. The first doorbell region is exposed to a configuration space of a host interface for connection with the host and is updated when the host issues an input/output (I/O) request command to the host memory. The fetch managing module fetches the command from the host memory in response to an event signal generated when the first doorbell region is updated. The data transferring module checks a location of the host memory based on request information included in the command, and performs a transfer of target data for the I/O request between the host memory and the non-volatile memory module. The completion handling module writes a completion request in the host memory and handles an interrupt when the data transferring module completes to process the I/O request. The second doorbell region is exposed to the configuration space and is updated when the I/O service is terminated by the host.

In some embodiments, the first doorbell region, the fetch managing module, the data transferring module, the completion handling module, and the second doorbell region may be implemented as hardware.

In some embodiments, the first doorbell region, the fetch managing module, the data transferring module, the completion handling module, and the second doorbell region may be implemented as the hardware at a register transfer level (RTL).

In some embodiments, the first doorbell region, the fetch managing module, the data transferring module, the completion handling module, and the second doorbell region may be connected by an internal memory bus of the non-volatile memory controlling device.

In some embodiments, the internal memory bus may include an advanced extensible interface (AXI) bus.

In some embodiments, the first doorbell region and the second doorbell region may be mapped an address space of the internal memory bus In some embodiments, the host interface may include a peripheral component interconnect express (PCIe) interface, and the configuration space may include base address registers (BARs).

In some embodiments, the fetch managing module may parse the request information from the command.

In some embodiments, the request information may include a logical address and a host memory address indicating a location of the host memory. The data transferring module may include a first engine that sets a source address and a destination address for the data transferring module based on the logical address and the host memory address, and a second engine that performs the transfer of the target data based on the source address and the destination address.

In some embodiments, the second engine may include a direct memory access (DMA) engine.

In some embodiments, the host memory address may include a physical region page (PRP).

In some embodiments, the first engine may bring a PRP list from the host memory based on the PRP, the PRP list may include at least one PRP entry indicating a location of the host memory, and the first engine may detect the location of the host memory indicated by the PRP entry.

In some embodiments, the non-volatile memory controlling device may connected to the non-volatile memory module through a plurality of channels, and the second engine may include a plurality of DMA cores that correspond to the plurality of channels, respectively.

In some embodiments, the second engine may split the target data for the I/O request into a plurality of data chunks and spread the data chunks across the plurality of DMA cores.

In some embodiments, a plurality of queue pairs may exist in the host memory, and each of the queue pairs may include a pair of submission queue (SQ) and competition queue (CQ). The fetch managing module may fetch the command from the SQ of the queue pair corresponding to an entry updated in the first doorbell region among the plurality of queue pairs.

In some embodiments, the completion handling module may detect the CQ corresponding to the SQ from which the command is fetched based on information forwarded from the fetch managing module.

According to another embodiment, a non-volatile memory controlling device configured to connect a non-volatile memory module and a host including a processor and a host memory is provided. The non-volatile memory controlling device includes a first module, a second module, a first engine, a second engine, and a third module. The first module includes a first doorbell region that is exposed to BARs of a PCIe interface for connection with the host and a second doorbell region. An entry corresponding a target SQ in the first doorbell region is updated when a command is written to the target SQ of the host memory, and an entry corresponding to a target CQ in the second doorbell region is updated when an I/O service is terminated by the host. The second module fetches the command from the target SQ in response to an event signal generated when the first doorbell region is updated. The first engine detects a location of the host memory based on a PRP included in the command. The second engine performs a transfer of target data for the I/O request between the location of the host memory detected by the first engine and the non-volatile memory module. The third module writes a completion request in the target CQ and handles an interrupt when the second engine completes to process the I/O request.

In some embodiments, the first engine may bring a PRP list from the host memory based on the PRP, the PRP list may include at least one PRP entry indicating a location of the host memory, and the first engine may detect the location of the host memory indicated by the PRP entry.

In some embodiments, the first module, the second module, the first engine, the second engine, and the third module may be implemented as hardware.

According to yet another embodiment, a non-volatile memory device configured to be connected to a host including a processor and a host memory is provided. The non-volatile memory device includes a non-volatile memory module, a first doorbell region, a fetch managing module, a data transferring module, a completion handling module, and a second doorbell region. The first doorbell region is exposed to a configuration space of a host interface for connection with the host and is updated when the host issues an I/O request command to the host memory. The fetch managing module fetches the command from the host memory in response to an event signal generated when the first doorbell region is updated. The data transferring module checks a location of the host memory based on request information included in the command, and performs a transfer of target data for the I/O request between the host memory and the non-volatile memory module. The completion handling module writes a completion request in the host memory and handles an interrupt when the data transferring module completes to process the I/O request. The second doorbell region is exposed to the configuration space and is updated when the I/O service is terminated by the host.

DETAILED DESCRIPTION OF THE EMBODIMENTS

Figure 1:
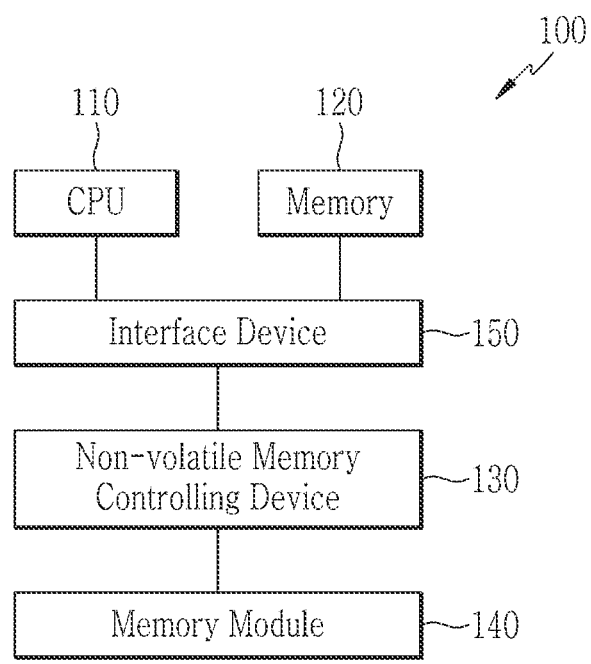
FIG. 1 is an example block diagram of a computing device according to an embodiment.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

As used herein, the singular forms "a", "an" and "the" are intended to include the plural forms as well, unless the context clearly indicates otherwise.

The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

FIG. 1 is an example block diagram of a computing device according to an embodiment.

Referring to FIG. 1, a computing device 100 includes a processor 110, a memory 120, a non-volatile memory controlling device 130, and a memory module 140. FIG. 1 shows an example of the computing device, and the computing device may be implemented by various structures.

In some embodiments, the computing device may be any of various types of computing devices. The various types of computing devices may include a mobile phone such as a smartphone, a tablet computer, a laptop computer, a desktop computer, a multimedia player, a game console, a television, and various types of Internet of Things (IoT) devices.

The processor 110 performs various operations (e.g., operations such as arithmetic, logic, controlling, and input/output (I/O) operations) by executing instructions. The processor may be, for example, a central processing unit (CPU), a graphics processing unit (GPU), a microprocessor, or an application processor (AP), but is not limited thereto. Hereinafter, the processor 110 is described as a CPU 110.

The memory 120 is a system memory that is accessed and used by the CPU 110, and may be, for example, a dynamic random-access memory (DRAM). In some embodiments, the CPU 110 and the memory 120 may be connected via a system bus. A system including the CPU 110 and the memory 120 may be referred to as a host. The memory 120 may be referred to as a host memory.

The memory module 140 is a non-volatile memory-based memory module. In some embodiments, the memory module 140 may be a flash memory-based memory module. The flash memory-based memory module 140 may be, for example, a solid-state drive (SSD), a secure digital (SD) card, a universal serial bus (USB) flash drive, or the like. In some embodiments, the memory module 140 may be a resistance switching memory based memory module. In one embodiment, the resistance switching memory may include a phase-change memory (PCM) using a resistivity of a storage medium (phase-change material), for example, a phase-change random-access memory (PRAM). In another embodiment, the resistance switching memory may include a resistive memory using a resistance of a memory device, or magnetoresistive memory, for example, a magnetoresistive random-access memory (MRAM). Hereinafter, the memory used in the memory module 140 is described as a PRAM.

The non-volatile memory controlling device 130 connects the host including the CPU 110 and the memory 120 to the memory module 140. In some embodiments, the non-volatile memory controlling device 130 may use a non-volatile memory express (NVMe) protocol as a protocol for accessing the NVM-based memory module 140. Hereinafter, the protocol is described as the NVMe protocol and the non-volatile memory controlling device 130 is described as an NVMe controlling device, but embodiments are not limited thereto and other protocols may be used.

In some embodiments, the NVMe controlling device 130 may be connected to the host through a host interface. In some embodiments, the host interface may include a peripheral component interconnect express (PCIe) interface. Hereinafter, the host interface is described as a PCIe interface, but embodiments are not limited thereto and other host interfaces may be used.

In some embodiments, the computing device 100 may further include an interface device 150 for connecting the NVMe controlling device 130 to the host including the CPU 110 and the memory 120. In some embodiments, the interface device 150 may include a root complex 150 that connects the host and the NVMe controlling device 130 in a PCIe system.

First, a typical storage device is described with reference to FIG. 2.

Figure 2:
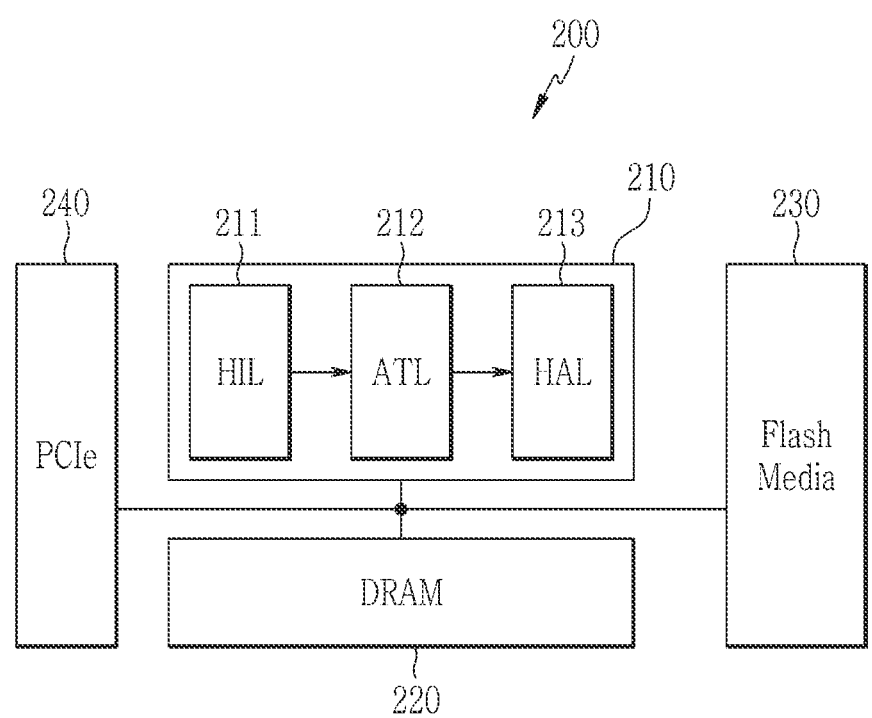
FIG. 2 is a block diagram of a typical storage device.

FIG. 2 is a block diagram of a typical storage device. For convenience of description, FIG. 2 shows an example of an SSD storage device to which a NAND flash memory is connected.

Referring to FIG. 2, the storage device 200 includes an embedded processor 210, an internal memory 220, and flash media 230. The storage device 200 is connected to a host through a PCIe interface 240. The storage device 200 may include a plurality of flash media 230 over multiple channels to improve parallelism and increase backend storage density. The internal memory 220, for example, an internal DRAM is used for buffering data between the host and the flash media 230. The DRAM 220 may also be used to maintain metadata of firmware running on the processor 210.

At the top of firmware stack of the processor 210, a host interface layer (HIL) 211 exists to provide a block storage compatible interface. The HIL 211 may manage multiple NVMe queues, fetches a queue entry associated with an NVMe request, and parse a command of the queue entry. When the request is a write, the HIL 211 transfers data of the write request to the DRAM 220. When the request is a read, the HIL 211 scans the DRAM 220 for serving data from the DRAM 220 directly.

Although the data may be buffered in the DRAM 220, the requests are eventually served from the flash media 230 in either a background or foreground manner. Accordingly, underneath the HIL 211, an address translation layer (ATL) 212 converts a logical block address (LBA) of the request to an address of the backend memory, i.e., the flash media 230. The ATL 212 may issue requests across multiple flash media 230 for parallelism. At the bottom of the firmware stack, a hardware abstraction layer (HAL) 213 manages memory protocol transactions for the request issued by the ATL 212.

Therefore, a design of efficient firmware takes a key role of the storage card. However, as access latency of the new nonvolatile memory is about a few μs, the firmware execution becomes a critical performance bottleneck. For example, when the PRAM is used as the backend memory of the storage device, the firmware latency on an I/O datapath may account for approximately 98% of an I/O service time at a device-level. To address this issue, a processor with more cores or a high-performance processor can be used. For example, computation cycles can be distributed across multiple such that a CPU burst for firmware can be reduced and the firmware latency can be overlapped with I/O burst latency of the backend memory. This can shorten overall latency, but many-cores and/or high-performance processors may consume more power, which may not fit well with an energy-efficient new memory based storage design. Hereinafter, embodiments for addressing this issue are described.

Figure 3:
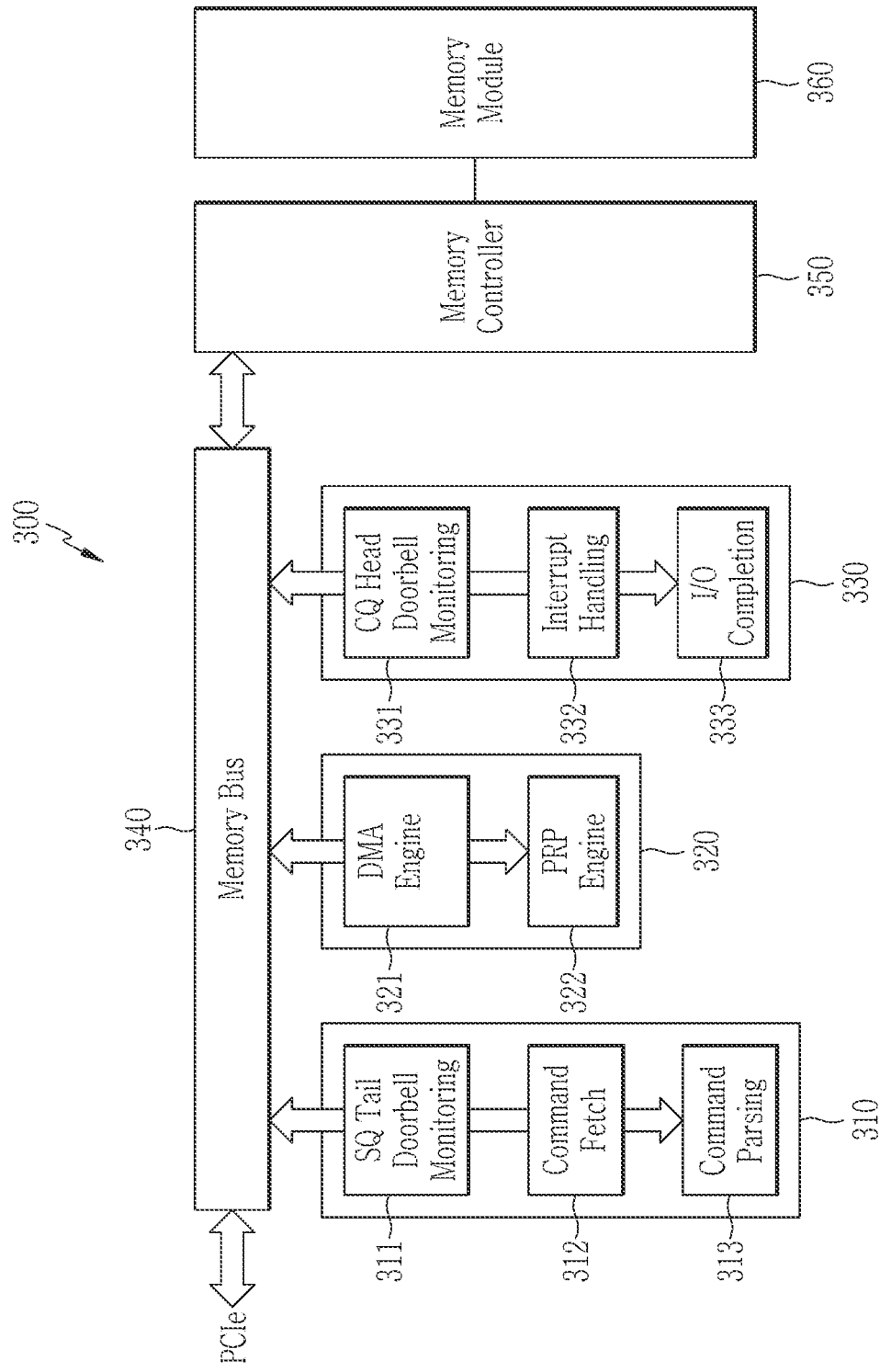
FIG. 3 is an example block diagram of an NVMe device according to an embodiment.

FIG. 3 is an example block diagram of an NVMe device according to an embodiment.

Referring to FIG. 3, the NVMe device 300 includes an NVMe controlling device and a memory module 360. The NVMe controlling device includes a queue dispatching module 310, a data transferring module 320, and a completion handling module 330.

The queue dispatching module 310 may perform a set of procedures including doorbell monitoring 311, command fetch 312, and command parsing 313. The queue dispatching module 310 is located at the beginning of a datapath of the NVMe device 300, and may fetch and parse an I/O request (i.e. NVMe command) from a submission queue (SQ) by monitoring a register (doorbell region) 311 mapped to an internal memory bus 340. The doorbell region 311 of the queue dispatching module 310 may be referred to as an SQ tail doorbell region.

The data transferring module 320 checks a data location in a host memory (e.g., 120 of FIG. 1) through a host memory address, and performs data transfer between the host memory 120 and the backend memory module 360. In some embodiments, the host memory address may be a physical region page (PRP). Hereinafter, the host memory address is described as the PRP. The PRP may indicate a target location of the host memory 120. In a read, the PRP may indicate a location to which target data is to be transferred. In a write, the PRP may indicate a location from which target data is to be fetched. In some embodiments, the data transfer may be performed by direct memory access (DMA). To this end, the data transferring module 320 may employ a DMA engine 321 and a PRP engine 322.

The completion handling module 330 may perform a set of procedures including doorbell monitoring 331, interrupt handling 332, and I/O completion 333. When the target data is written to the backend memory module 360 or the target data is transferred (e.g., read) from the backend memory module 360 to the host memory 120, the completion handling module 330 may manage an interrupt and a completion queues (CQ) over a register mapped to the internal memory bus 340 (i.e., a doorbell region). The doorbell region of the completion handling module 330 may be referred to as a CQ head doorbell region.

In some embodiments, the queue dispatching module 310, the data transferring module 320, and the completion handling module 330 may be implemented as hardware modules. In some embodiments, the queue dispatching module 310, the data transferring module 320 and the completion handling module 330 may be implemented in integrated circuits, for example field-programmable gate array (FPGAs). For example, the queue dispatching module 310, the data transferring module 320, and the completion handling module 330 may be implemented on an FPGA board of Xilinx using an UltraScale™ chip and a PCIe Gen3 interface. In some embodiments, the queue dispatching module 310, the data transferring module 320, and the completion handling module 330 may be implemented as hardware modules at a register transfer level (RTL).

In some embodiments, the NVMe controlling device may further include a memory controller 350 that performs I/O services in the backend memory module 360. In some embodiments, the memory controller 350 may be implemented as a part of the full hardware design of the NVMe controlling device.

In some embodiments, the queue dispatching module 310, the data transferring module 320, and the completion handling module 330 may be connected to the PCIe interface and the memory controller 350 through the internal memory bus 340. In some embodiments, the internal memory bus 340 may include an internal system on chip (SoC) memory bus. In some embodiments, the internal memory bus 340 may include an advanced extensible interface (AXI) interface. In some embodiments, the internal memory bus 340 may include an AXI crossbar.

In some embodiments, FPGA logic modules may be classified into two: a frontend automation and a backend automation. The frontend automation may include most logic modules for the queue dispatching module 310 and the completion handling module 330. In addition, the frontend automation may expose a configuration space of the host interface to the host by mapping the configuration space to a host address space. In addition, the frontend automation may map the configuration space to the internal memory bus 340. In some embodiments, the configuration space may include PCIe base address registers (BARs). The queue dispatching module 310 may fetch and parse the NVMe command issued by the host, while the completion handling module 330 may manage I/O request completion including interrupt handling. The completion handling module 330 may maintain all contexts to automatically pair different SQs and CQs by collaborating with the queue dispatching module 310. The backend automation may include the data transferring module 320. In some embodiments, the backend automation may further include the memory controller 350. The data transferring module 320 may traverse all PRP entries and migrate target data between the host memory 120 and the backend memory module 360 through the memory controller 350 and the DMA engine.

Figure 4:
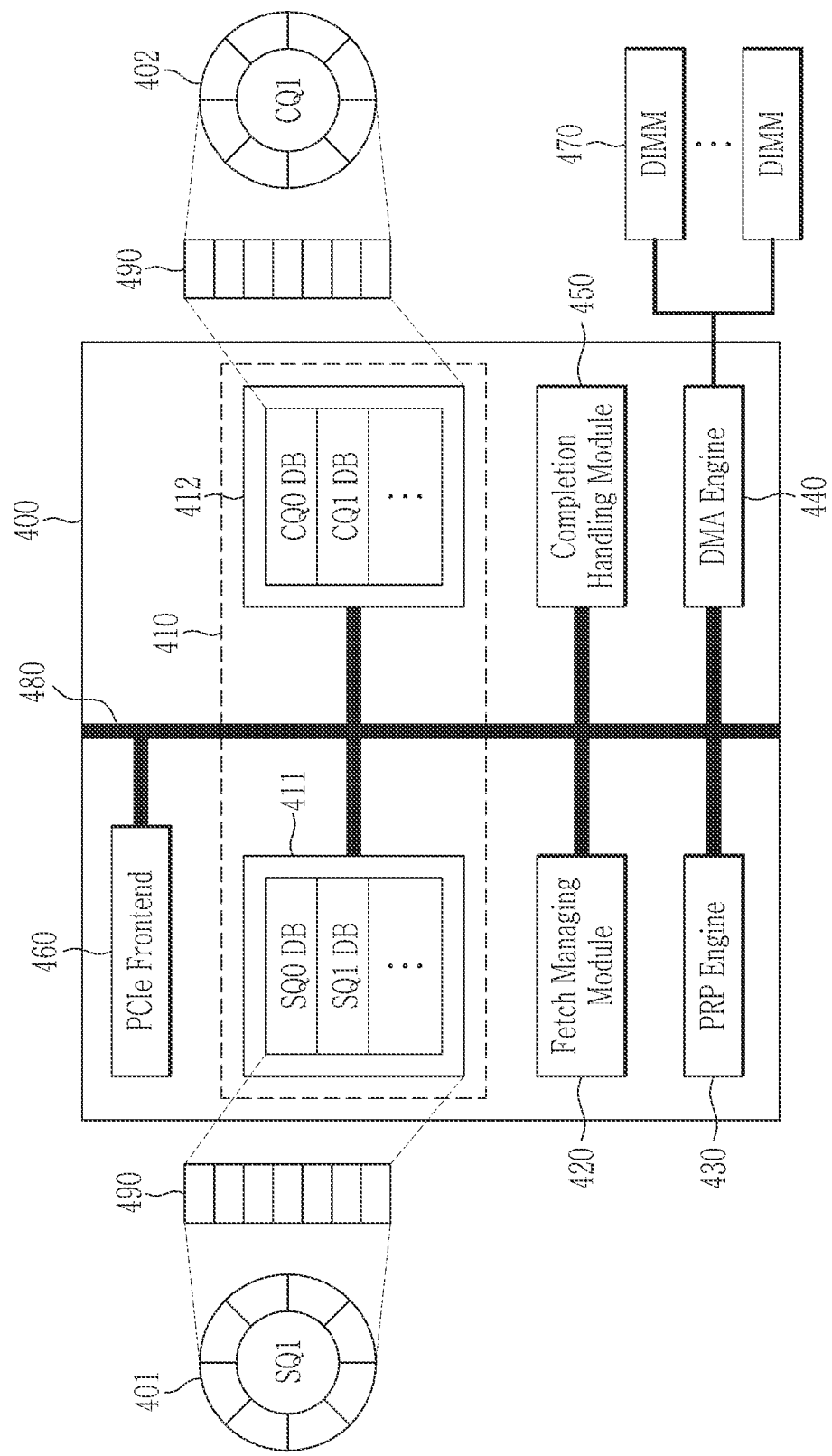
FIG. 4 is a diagram showing an example of an NVMe controlling device according to an embodiment.
Figure 5:
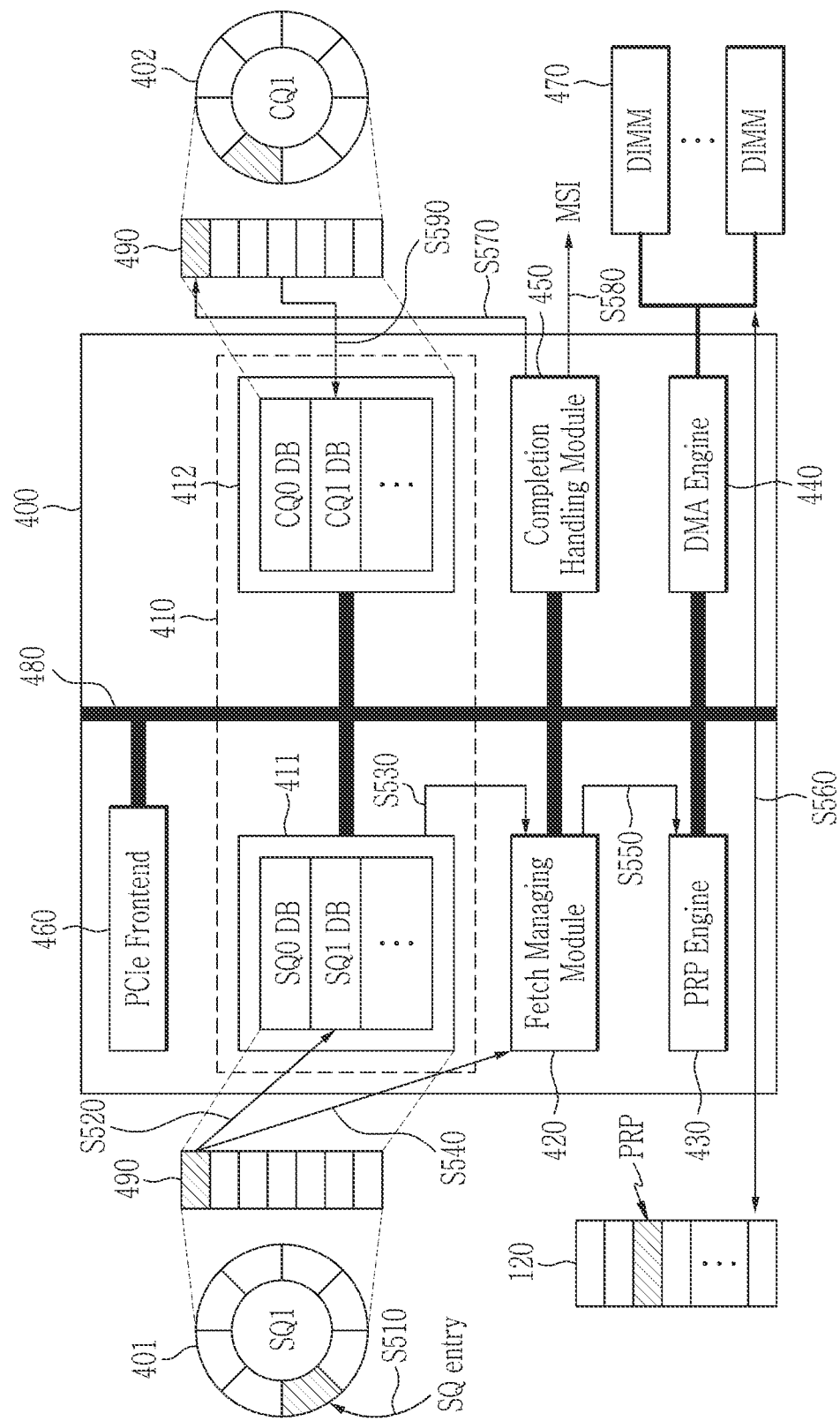
FIG. 5 is a diagram showing an example of an operation of the NVMe controlling device according to an embodiment.

FIG. 4 is a diagram showing an example of an NVMe controlling device according to an embodiment, and FIG. 5 is a diagram showing an example of an operation of the NVMe controlling device according to an embodiment.

Referring to FIG. 4, an NVMe controlling device 400 includes a context module 410, a fetch managing module 420, a PRP engine 430, a data transferring engine 440, and a completion handling module 450. In some embodiments, the data transferring engine 440 may be a direct memory access (DMA) engine. Hereinafter, the data transferring engine 440 is described as the DMA engine. In some embodiments, the NVMe controlling device 400 may be connected to a host through a PCIe interface. In some embodiments, the NVMe controlling device 400 may further include a PCIe frontend 460 to connect to the host through the PCIe interface. In addition, the NVMe controlling device 400 is connected to a backend memory module 470. In FIG. 4, a plurality of memory modules are shown as the back-end memory module 470, and each memory module 470 may be, for example, a dual in-line memory module (DIMM). In some embodiments, the NVMe controlling device 400 may further include a memory controller (not shown) for controlling the memory module 470.

In some embodiments, the context module 410, the fetch managing module 420, the PRP engine 430, the data transferring engine 440, the completion handling module 450, and the PCIe frontend 460 may be connected to each other via an internal memory bus 480. In some embodiments, the memory bus 480 may include an AXI interface.

In some embodiments, the context module 410, the fetch managing module 420, the PRP engine 430, the data transferring engine 440, the completion handling module 450, and the PCIe frontend 460 may be implemented as hardware modules. In some embodiments, the context module 410, the fetch managing module 420, the PRP engine 430, the data transferring engine 440, the completion handling module 450, and the PCIe frontend 460 may be implemented in FPGAs. In some embodiments, the context module 410, the fetch managing module 420, the PRP engine 430, the data transferring engine 440, the completion handling module 450, and the PCIe frontend 460 may be implemented as hardware modules at a RTL A pair of a submission queue (SQ) 401 and a completion queue (CQ) 402 is formed in the host to manage input/output (I/O) requests. In some embodiments, when the CPU (e.g., 110 of FIG. 1) includes a plurality of cores, the pair of SQ 401 and CQ 402 may be formed per core. In some embodiments, the pair of SQ 401 and CQ 402 may be formed in a host memory. In some embodiments, the host memory may include a system memory (e.g., 120 of FIG. 1). In FIG. 4, for convenience of description, the pair of SQ 401 and CQ 402 (SQ1 and CQ1) of one core is shown.

Referring to FIG. 4 and FIG. 5, in order for the host to issue a command (e.g., NVMe command) generated according to an I/O request, the host pushes (e.g., writes) an NVMe command, i.e., an SQ entry, to the SQ 401 at step S510. In some embodiments, a new SQ entry may be written to the tail of the SQ 401 so that the host can increment a tail pointer of the SQ 401. In this way, when the host writes the SQ entry to the SQ 401 thereby issuing the NVMe command, the host writes (e.g., rings) an SQ tail doorbell (DB) at step 520. To this end, the context module 410 may include a doorbell region including a set of doorbell entries 411 for keeping track of a tail pointer per SQ and a set of doorbell entries 412 for keeping track a head pointer per CQ. Accordingly, doorbell entries (SQ0 DB, SQ1 DB, CQ0 DB, and CQ1 DB) may be provided for each queue. In some embodiments, the SQ tail doorbell region 411 and the CQ head doorbell region 412 may be mapped to an internal memory bus address space of the NVMe controlling device 400 and exposed to a BAR 490 of the PCIe interface. Accordingly, when the host writes the SQ entry in the SQ 401, the host may write the tail pointer in the corresponding doorbell entry of the SQ tail doorbell region 411 through the BAR 490. In some embodiments, since ringing (i.e., updating) a doorbell from the host side is a process of writing a PCIe packet (i.e., a PCIe inbound process), the NVMe controlling device 400 may monitor the doorbell event through the memory bus address space mapped to the doorbell region 411.

The context module 410 generates an event signal in response to the doorbell event (i.e., the doorbell update) of the SQ tail doorbell region 411 and passes the event signal to the fetch managing module 420 at step S530. In some embodiments, whenever the tail pointer is written in the doorbell entry of the SQ tail doorbell region 411, the context module 410 may pass the event signal through the memory bus address space mapped to the SQ tail doorbell region 411 at step S530.

The fetch managing module 420 checks delivered information through the event signal received from the context module 410 and fetches a target SQ entry (i.e., NVMe command) from the host memory 120 at step S540. In some embodiments, since doorbell events may occur simultaneously, the fetch managing module 420 may arbitrate between different NVMe queues. For example, the fetch managing module 420 may arbitrate between the different NVMe queues based on the NVMe specification. After fetching the NVMe command, the fetch managing module 420 parses request information of the I/O request from the NVMe command and forward it to the PRP engine 430 at step S550. In some embodiments, the request information may include an operation code (opcode), a logical address, a size, and a PRP. In some embodiments, the operation code may indicate read, write, and the like. In some embodiments, the logical address may be a logical block address (LBA). Hereinafter, the logical address is described as an LBA. For example, the LBA may indicate an address of a logical block to be performed (e.g., to be read or written) with an operation indicated by the operation code. In some embodiments, the PRP may indicate a target location of the host memory 120. In a read, the PRP may indicate a location to which target data is to be transferred. In a write, the PRP may indicate a location from which target data is to be fetched.

The PRP engine 430 sets a source address and a destination address of the DMA engine 440 based on the request information received from the context module 410 at step S560. The DMA engine 440 transfers target data between the host memory 120 and the back-end memory module 470 based on the source address and the destination address at step S560.

In some embodiments, to handle page-aligned data, the PRP engine 430 may access a location of the host memory 120 via the PRP and set the source address and destination address of the DMA engine 440. In some embodiments, when the operation code (opcode) of the request information indicates the read, the source address may be an address of the backend memory module 470 and the destination address may be an address of the host memory 120. When the operation code (opcode) of the request information indicates the write, the source address may be the address of the host memory 120 and the destination address may be the address of the backend memory module 470. In some embodiments, the address of the host memory 120 may be set based on the PRP, and the address of the backend memory module 470 may be set based on the logical address.

In some embodiments, when the operation code of the request information indicates the write, the DMA engine 440 may read the target data of the I/O request from the host memory 120 based on the request information, and write the target data to the backend memory module 470 based on the request information at step S560. When the operation code of the request information indicates the read, the DMA engine 440 may read the target data of the I/O request from the backend memory module 470 based on the request information, and write the target data to the host memory 120 based on the request information at step S560.

In some embodiments, in the write, the PRP engine 430 may copy data from the host memory 120 to the DMA engine 440 for each 512B chunk. In some embodiments, the DMA engine 440 may use a plurality of DMA cores to parallelize the data transfer process. In some embodiments, the number of DMA cores may be set based on the number of channels in the backend memory module 470. For example, the number of DMA cores may be equal to the number of channels in the backend memory module 470. In some embodiments, the DMA engine 440 may split the target data of a single request into a plurality of small-sized data chunks and spread the data chunks across the plurality of DMA cores, which can shorten the I/O latency of the memory module 470.

In some embodiments, when a payload size of a PCIe packet is 4 KB, the target data may exist in two different memory pages of the host memory 120 if an offset of the request is not aligned by a 4 KB boundary. In this case, as shown in FIG. 5, the PRP engine 430 may fetch target data from two different locations of the host memory 120, referred to as PRP1 and PRP2, respectively. In some embodiments, when a size of the request is equal to or smaller than the page, the DMA engine 440 may fetch or deliver the target data through the PRP1 that directly indicates the location of the host memory 120. When the size of the request is greater than the page, the PRP engine 430 may first bring a PRP list from the host memory 120 through the PRP2. The PRP list may be a set of pointers and include at least one PRP entry indicating 4 KB data. Accordingly, the PRP engine 430 may parse each PRP entry of the PRP list. In some embodiments, the PRP engine 430 may parse PRP entries within backend memory module 470. The PRP engine 430 may then traverse all entries in the PRP list and detect the location of the host memory 120 referenced (i.e., indicated) by each entry. When the data transfer is completed in the DMA engine 440, the PRP engine 430 signals the completion handling module 450 that creates a completion request (i.e., a CQ entry) and manages a message-signaled interrupt (MSI) packet at step S560.

As described above, in the write, the target data may be transferred from the host memory 120 to the NVMe controlling device 400 through a PCIe inbound link. In the read, the target data may be transferred to the host memory 120 through a PCIe outbound link.

The completion handling module 450 handles I/O completion and interrupts. When the PRP engine 430 and the DMA engine 440 complete to process the I/O request, the completion handling module 450 automatically detects a target CQ 402 to which the CQ entry is to be written. In some embodiments, the completion handling module 430 may detect the target CQ 402 by checking request information forwarded from the fetch managing module 420. When the completion handling module 450 finds out the target CQ 402, it posts the CQ entry by writing the CQ entry in a location of the host memory 120 corresponding to the target CQ 402 at step S570. In some embodiments, the CQ entry may be written to a head of the CQ 402 so that the completion handling module 430 may increment a head pointer of the CQ 402. Next, the completion handling module 450 informs the host of the completion of the I/O service by interrupting the host at step S580. In some embodiments, the completion handling module 450 may interrupt the host by pushing (e.g., writing) a PCIe packet (MSI packet) to an MSI region managed by a driver of the host. In some embodiments, the host driver may invoke its own interrupt service routine to inform the completion to the user requesting the I/O service. The host terminates the I/O service and creates a CQ head doorbell at step S590. In some embodiments, the host may write the head pointer to the corresponding doorbell entry in the CQ head doorbell region 412 via the BAR 490. In this way, by updating the CQ head doorbell region 412, a state of the CQ 402 can be synchronized with the NVMe controlling device 400. That is, the queue synchronization means that the completion handling module 450 releases the target entries of the SQ 401 and CQ 402. In this way, the internal CQ and SQ states of the NVMe controlling device 400 can be consistent with the host-side SQ and CQ states.

In some embodiments, in order to enhance the responsiveness of the frontend (i.e., the SQ tail doorbell region 411 and the fetch managing module 420), the fetch managing module 420 may keep processing other remaining requests during the operations of the DMA module 440 and completion handling module 450 in a pipelined manner at step S550.

In some embodiments, the SQ tail doorbell region 411 and the CQ head doorbell region 412 may be located side by side to make the NVMe queue easy to manage. However, as the inflow velocity of NVMe submissions and the inflow velocity of NVMe completions are asymmetric, a physical integration of the SQ tail doorbell region 411 and the CQ head doorbell region 412 may not be promising from both performance and implementation angles. Thus, in some embodiments, the SQ tail doorbell region 411 and the CQ head doorbell region 412 may be completely separated. In this case, as described above, the CQ and SQ states may be paired.

In some embodiments, the processes of writing the doorbell in the SQ tail doorbell region 411, fetching the SQ entry, bringing the PRP, and writing the doorbell in the CQ head doorbell region 412 (S520, S540, S560, and S590) may be a PCIe inbound process that writes a PCIe packet. Meanwhile, in a read request, a process of writing data to the host memory 120 may be a PCIe outbound process. Therefore, in the read request, the data and the NVMe payloads (doorbell, SQ entry, and PRP) can be processed in parallel, thereby reducing the latency.

In some embodiments, the SQ tail doorbell region 411 of the context module 410 and the fetch managing module 420 may operate as a queue dispatching module (e.g., 310 of FIG. 3), the PRP engine 430 and the DMA engine 440 may operate as a data transferring module (e.g., 320 of FIG. 3), and the completion handling module 450 and the CQ head doorbell region 412 of the context module 410 may operate as a completion handling modules (e.g., 330 of FIG. 3).

As described above, the NVMe controlling device can be implemented by fully automating NVMe control logic over hardware. Accordingly, the NVMe payload and data can be processed without software intervention. As a result, it is possible to remove or reduce the latency and heat problems that may occur due to execution of firmware in an internal processor of the NVMe controlling device.

Figure 6:
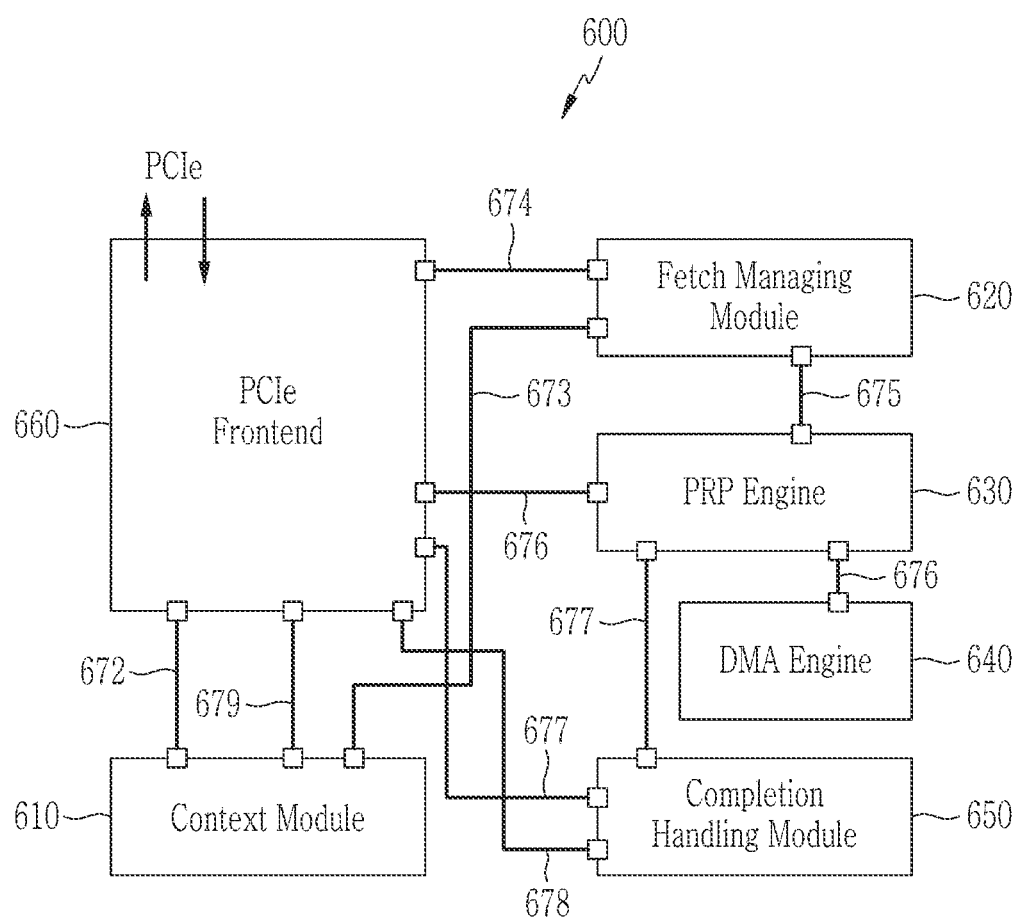
FIG. 6 is a diagram showing an example of a connection relationship in an NVMe controlling device according to an embodiment.

FIG. 6 is a diagram showing an example of a connection relationship in an NVMe controlling device according to an embodiment.

Referring to FIG. 6, an NVMe controlling device 600 includes a context module 610, a fetch managing module 620, a PRP engine 630, a DMA engine 640, and a completion handling module 650. In some embodiments, the NVMe controlling device 600 may further include a PCIe frontend 660. These modules 610 to 660 may be connected through an internal memory bus. In some embodiments, the internal memory bus may include an SoC memory bus. In some embodiments, the internal memory bus may include an advanced extensible interface (AXI) bus.

The context module 610 may be connected to the frontend 660 through a memory bus 672 to receive a SQ tail pointer from a host. The context module 610 may be connected to the fetch managing module 620 through a memory bus 673 to deliver an event signal to the fetch managing module 620. The fetch managing module 620 may be connected to the frontend 660 through a memory bus 674 to fetch a target SQ entry from an SQ of the host memory.

The PRP engine 630 may be connected to the fetch managing module 620 through a memory bus 675 to receive request information from the fetch managing module 620. The PRP engine 630 may be connected to the frontend 660 and the DMA engine 640 through a memory bus 676 to fetch target data from the host memory and transfer the target data to the DMA engine 640 or transfer the target data transferred through the DMA engine 640 to the host memory.

The completion handling module 650 may be connected to the PRP engine 630 through a memory bus 677 to receive a completion request from the PRP engine 630, and may connected to the frontend 660 through a memory bus 677 to write the CQ entry to a CQ of the host memory. In addition, the completion handling module 650 may be connected to the frontend 660 through a memory bus 678 to interrupt the host to inform the host of the completion of the I/O service. The context module 610 may be connected to the frontend 660 through a memory bus 679 to receive a CQ head pointer from the host.

In some embodiments, in order to make the NVMe controlling device work with a high frequency, inputs and outputs of modules may be connected in only a single direction. In some embodiments, if there is necessary information that is not forwarded transferred from a source module, a target module may directly retrieve the necessary information from a memory address space of the memory bus (e.g., AXI crossbar). In some embodiments, each module may process different parts of the I/O request in a pipelined manner, thereby improving the bandwidth of I/O processing.

In some embodiments, the NVMe controlling device may separate a memory controller from logic modules (e.g., 310 to 330 in FIG. 3, or 410 to 450 in FIG. 4), and then group the logic modules by considering a boundary of a super logic region (SLR). In some embodiments, while all logic modules may be located around the PCIe and AXI crossbar, modules associated with the data transferring and DMA engine, including the memory controller, may occupy only two SLRs.

While this invention has been described in connection with what is presently considered to be various embodiments, it is to be understood that the invention is not limited to the disclosed embodiments. On the contrary, it is intended to cover various modifications and equivalent arrangements included within the spirit and scope of the appended claims.

What is claimed is:

1. A non-volatile memory controlling device configured to connect a non-volatile memory module and a host including a processor and a host memory, the device comprising:

a first doorbell region that is exposed to a configuration space of a host interface connecting with the host and is updated when the host issues an input/output (I/O) request command to the host memory;
a fetch managing module that fetches the command from the host memory in response to an event signal generated when the first doorbell region is updated;
a data transferring module that checks a location of the host memory based on request information included in the command, and performs a transfer of target data for the I/O request between the host memory and the non-volatile memory module;
a completion handling module that writes a completion request in the host memory and handles an interrupt when the data transferring module completes to process the I/O request; and
a second doorbell region that is exposed to the configuration space and is updated when the I/O service is terminated by the host;
wherein the request information includes a logical address and a host memory address indicating a location of the host memory, and
wherein the data transferring module includes
a first engine that sets a source address and a destination address for the data transferring module based on the logical address and the host memory address, and
a second engine that performs the transfer of the target data based on the source address and the destination address.

2. The device of claim 1, wherein the first doorbell region, the fetch managing module, the data transferring module, the completion handling module, and the second doorbell region are implemented as hardware.

3. The device of claim 1, wherein the first doorbell region, the fetch managing module, the data transferring module, the completion handling module, and the second doorbell region are implemented as the hardware at a register transfer level (RTL).

4. The device of claim 1, wherein the first doorbell region, the fetch managing module, the data transferring module, the completion handling module, and the second doorbell region are connected by an internal memory bus of the non-volatile memory controlling device.

5. The device of claim 4, wherein the internal memory bus includes an advanced extensible interface (AXI) bus.

6. The device of claim 4, wherein the first doorbell region and the second doorbell region are mapped an address space of the internal memory bus.

7. The device of claim 1, wherein the host interface includes a peripheral component interconnect express (PCIe) interface, and
wherein the configuration space includes base address registers (BARs).

8. The device of claim 1, wherein the fetch managing module parses the request information from the command.

9. The device of claim 1, wherein the second engine includes a direct memory access (DMA) engine.

10. The device of claim 1, wherein the host memory address includes a physical region page (PRP).

11. The device of claim 10, wherein the first engine brings a PRP list from the host memory based on the PRP,
wherein the PRP list includes at least one PRP entry indicating a location of the host memory, and
wherein the first engine detects the location of the host memory indicated by the PRP entry.

12. The device of claim 1, wherein the non-volatile memory controlling device is connected to the non-volatile memory module through a plurality of channels, and
wherein the second engine includes a plurality of DMA cores that correspond to the plurality of channels, respectively.

13. The device of claim 12, wherein the second engine splits the target data for the I/O request into a plurality of data chunks and spreads the data chunks across the plurality of DMA cores.

14. The device of claim 1, wherein a plurality of queue pairs exist in the host memory,
wherein each of the queue pairs includes a pair of submission queue (SQ) and competition queue (CQ), and
wherein the fetch managing module fetches the command from the SQ of the queue pair corresponding to an entry updated in the first doorbell region among the plurality of queue pairs.

15. The device of claim 14, wherein the completion handling module detects the CQ corresponding to the SQ from which the command is fetched based on information forwarded from the fetch managing module.

16. A non-volatile memory device configured to be connected to a host including a processor and a host memory, the device comprising:
a non-volatile memory module;
a first doorbell region that is exposed to a configuration space of a host interface connecting with the host and is updated when the host issues an input/output (I/O) request command to the host memory;
a fetch managing module that fetches the command from the host memory in response to an event signal generated when the first doorbell region is updated;
a data transferring module that checks a location of the host memory based on request information included in the command, and performs a transfer of target data for the I/O request between the host memory and the non-volatile memory module;
a completion handling module that writes a completion request in the host memory and handles an interrupt when the data transferring module completes to process the I/O request; and
a second doorbell region that is exposed to the configuration space and is updated when the I/O service is terminated by the host;
wherein the request information includes a logical address and a host memory address indicating a location of the host memory, and
wherein the data transferring module includes
a first engine that sets a source address and a destination address for the data transferring module based on the logical address and the host memory address, and
a second engine that performs the transfer of the target data based on the source address and the destination address.

* * * * *